(12) United States Patent
McKechnie et al.

(10) Patent No.: US 10,024,460 B2
(45) Date of Patent: Jul. 17, 2018

(54) CONDUCTOR REMOVAL SYSTEM (71) Applicant: Oceaneering International, Inc., Houston, TX (US)

(72) Inventors: Dave McKechnie, Ellon Aberdeenshire (GB); Steffan Kruse Lindsø, Hafrsfjord (NO)

(73) Assignee: OCEANEERING INTERNATIONAL, INC., Houston, TX (US)

(*) Notice: Subject to any disclaimer, the term of this patent is extended or adjusted under 35 U.S.C. 154(b) by 0 days.

(21) Appl. No.: 15/788,077

(22) Filed: Oct. 19, 2017

(65) Prior Publication Data

US 2018/0106394 A1 Apr. 19, 2018

Related U.S. Application Data (60) Provisional application No. 62/410,067, filed on Oct. 19, 2016.

(51) Int. Cl.
*E21B 29/00* (2006.01)
*F16L 1/16* (2006.01)
*F16L 1/20* (2006.01)

(52) U.S. Cl.
CPC .............. *F16L 1/166* (2013.01); *F16L 1/20* (2013.01)

(58) Field of Classification Search
CPC combination set(s) only.
See application file for complete search history.

(56) References Cited

U.S. PATENT DOCUMENTS

| | | | |
|---|---|---|---|
| 6,524,030 B1* | 2/2003 | Giovannini | B63B 35/03 405/166 |
| 2006/0115331 A1* | 6/2006 | Matteucci | B23D 57/0084 405/156 |
| 2010/0163244 A1* | 7/2010 | Desai | E21B 23/14 166/361 |
| 2011/0158748 A1* | 6/2011 | Brocklebank | F16L 1/19 405/158 |
| 2011/0262229 A1* | 10/2011 | Tame | F16L 1/166 405/166 |

* cited by examiner

*Primary Examiner* — Kyle Armstrong
(74) *Attorney, Agent, or Firm* — Maze IP Law, PC (57) ABSTRACT In general, a conductor removal system 1 comprises a conductor sectioning tower which can be used to automate lifting and landing of various conductor sections. In most embodiments, the conductor sectioning tower can selectively and controllably go between an initially compact position to a raised, substantially vertical position with respect to the conductor removal system's transport frame. Conductors are cut creating a severed conductor section which can be positioned onto a conductor landing cart for further removal processing.

18 Claims, 9 Drawing Sheets

FIGURED 12G

CONDUCTOR REMOVAL SYSTEM

RELATION TO PRIOR APPLICATIONS

This application claims the benefit of U.S. Provisional Patent Application 62/410,067 titled "Conductor Removal System" filed on Oct. 19, 2016.

BACKGROUND OF THE INVENTION

Conductors, e.g. tubulars such as risers, often need to be removed via sectioning subsea. This often requires a dedicated, erect tower and crane. Further, the process can often be manual, requiring significant human intervention, personnel skills, teamwork, and a large crew.

DESCRIPTION OF THE DRAWINGS

The figures supplied herein illustrate various embodiments of the invention.

FIGS. 12A-12J are views in partial perspective of the second exemplary embodiment processing and cutting a conductor.

DESCRIPTION OF EXEMPLARY EMBODIMENTS

Figure 1:
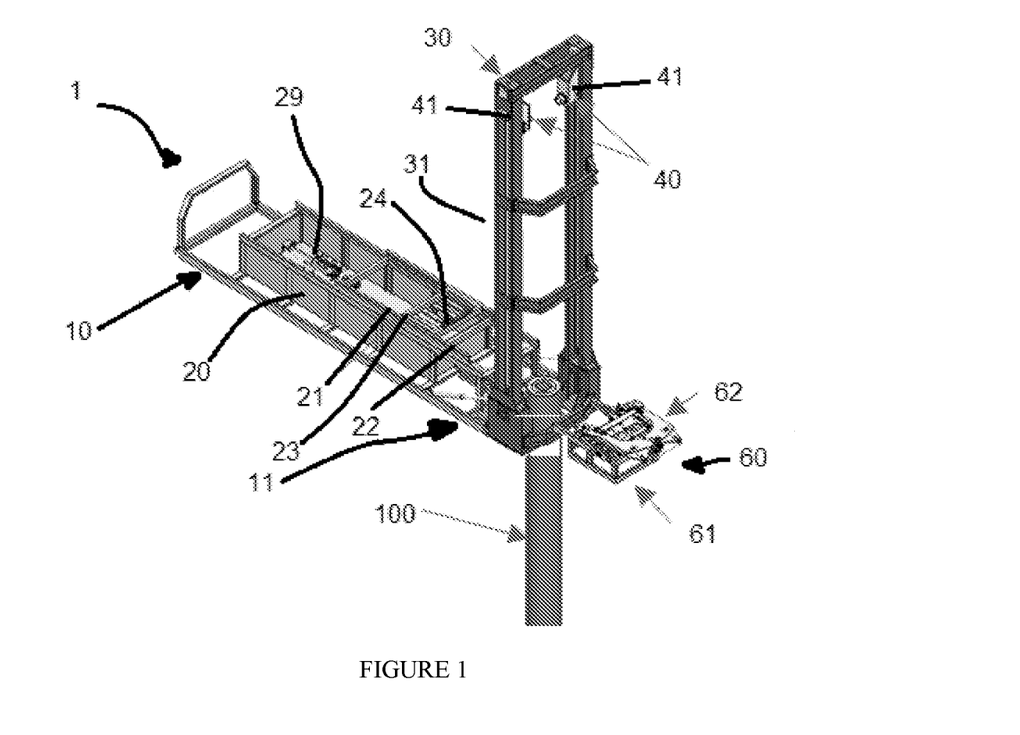
FIG. 1 is view in partial perspective of a first exemplary embodiment of the invention.
Figure 2:
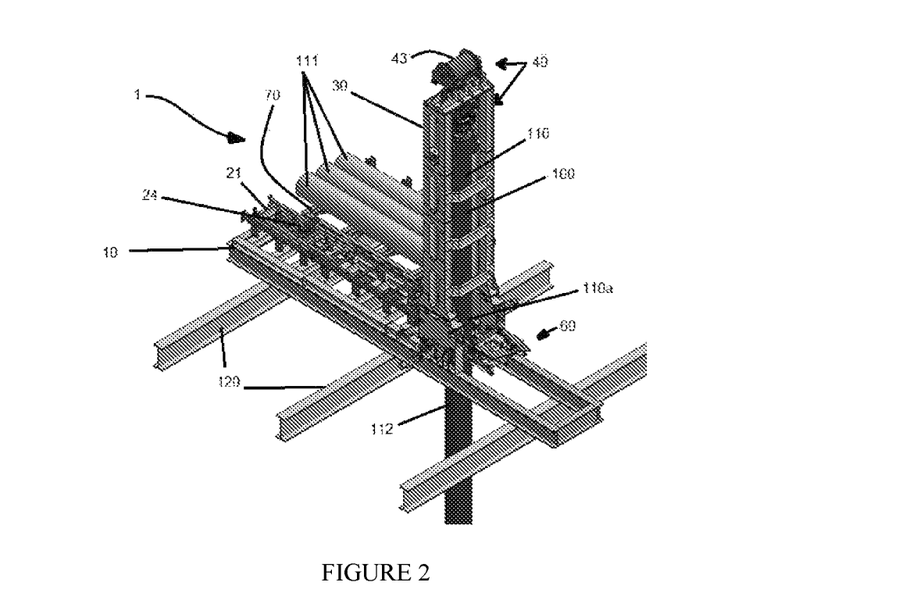
FIG. 2 is a view in partial perspective of a second exemplary embodiment of the invention.

In general, referring to FIGS. 1 and 2, conductor removal system 1 comprises a conductor sectioning tower, i.e. lifting tower 30, which can be used to automate lifting and landing of various sections of conductor 100. In most embodiments, conductor removal system 1 is modular and can self-erect or be controllably erected and allow for a fully automated lift-hold-land operation for conductor sectioning.

Referring now to FIG. 1, conductor removal system 1 comprises transport frame 10, comprising conductor receiving end 11; conductor landing cart assembly 20 which is connected to transport frame 10 and which comprises one or more conductor landing carts 21 operatively movable with respect to transport frame 10 such as by using conductor landing cart assembly mover 29 and configured to receive a portion of conductor 100 once cut; lifting tower 30, which may be modular to allow varying lifting tower 30 height, pivotally connected to transport frame 10 proximate conductor receiving end 11; lifting assembly 40 disposed about upper section 31 of lifting tower 30 where a portion of lifting assembly 40 may be slidingly mounted about or within a predetermined portion of lifting tower 30 such as an inside portion of lifting tower 30; and conductor cutter assembly 60 comprising conductor cutter support 61, which typically is a table or similar structure, and conductor cutter 62 selectively movably connected to conductor cutter support 61.

Figure 6:
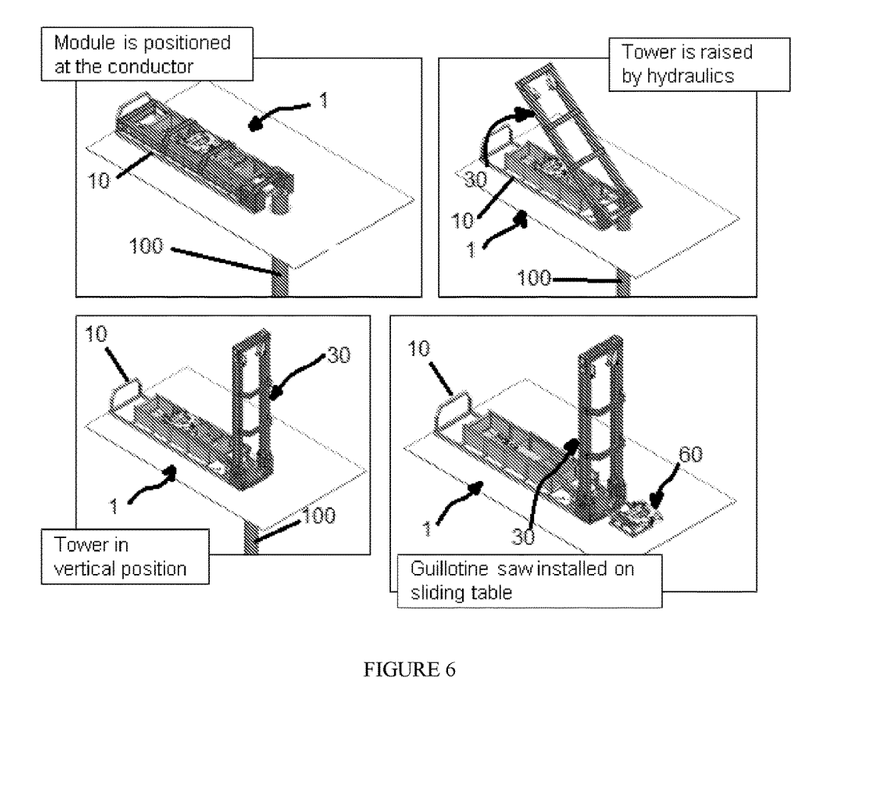
FIG. 6 are views in partial perspective of an exemplary embodiment of the invention being deployed.

As illustrated in FIG. 6, in a current preferred embodiment, lifting tower 30 is currently envisioned as being installed in horizontal position and then erected or returned to a non-erect position.

Figure 7:
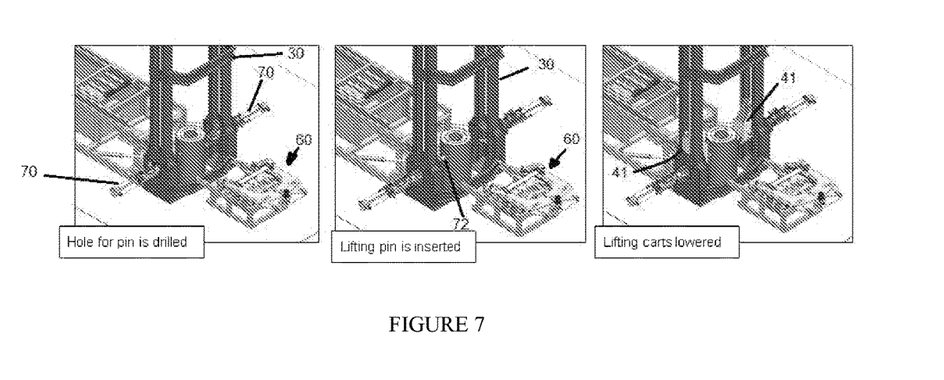
FIG. 7 are views in partial perspective of an exemplary embodiment of the invention inserting pins.
Figure 8:
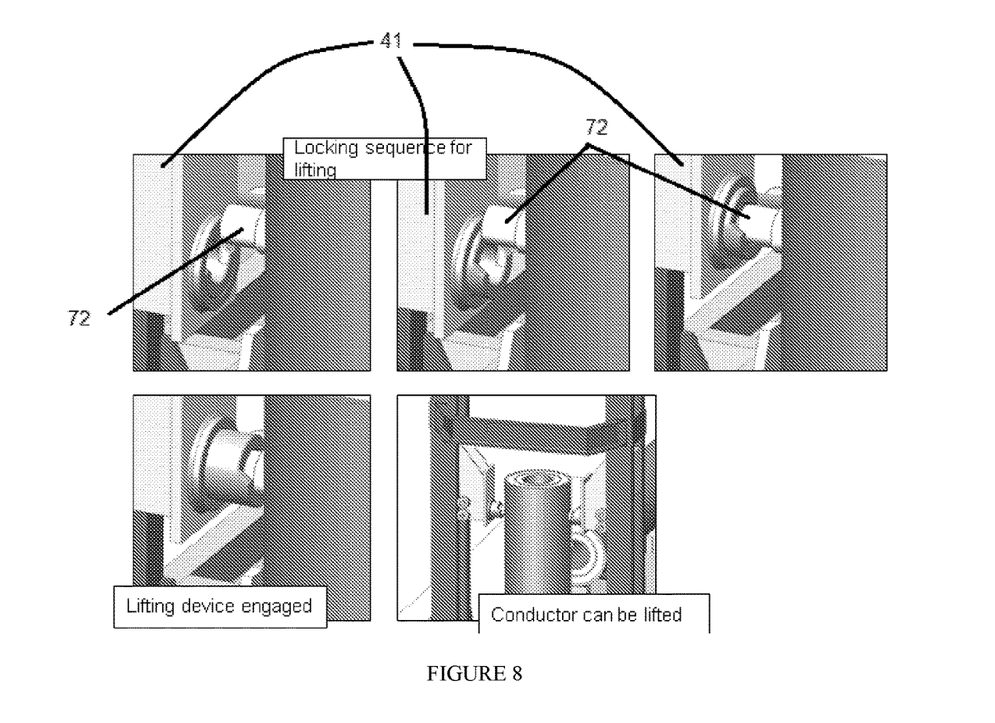
FIG. 8 are views in partial perspective illustrating an exemplary locking sequence.
Figure 12A:
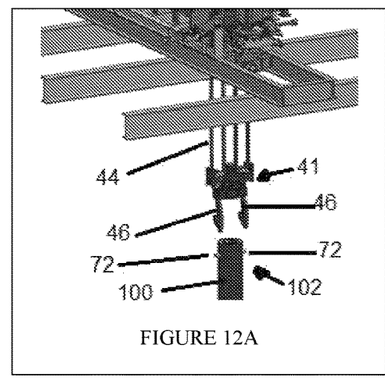
Figure 12B:
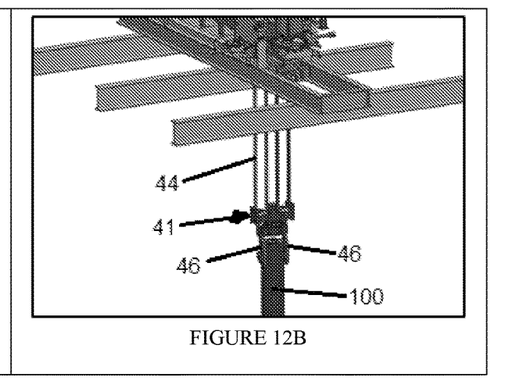

In embodiments, referring additionally to FIG. 7, conductor removal system 1 typically further comprises one or more conductor drills 70 positioned about a predetermined portion of lifting tower 30, e.g. proximate conductor receiving end 11; a corresponding set of selectively movable drill doors 71 (FIG. 12F); and one or more first securing pins 72 (FIG. 12F) adapted to be pivotally received into first hole 101 (FIG. 12F) located at first predetermined location 102 (FIG. 12A) proximate a first predetermined portion of conductor 100, e.g. proximate an upper end of conductor 100. One or more second securing pins 73 (FIG. 12G) may be present as well and adapted to be pivotally received into second hole 105 (FIG. 12E) located at second predetermined location 104 (FIG. 12G) proximate a second predetermined portion of conductor 100 where second predetermined portion 104 of conductor 100 is located along conductor 100 away from the first predetermined location of conductor 100. In certain embodiments, drilling occurs at the base of lifting tower 30. However, a space issue may only allow for one pin 72,73, which may not be enough. Drilling on a lower floor may therefore be appropriate.

Typically, referring back to FIG. 1, conductor cutter support 61 is movably disposed about a portion of conductor landing cart 21, by way of example and not limitation where the portion of conductor landing cart 21 is interior to conductor landing cart 21.

Conductor cutter 62 typically comprises a wire saw such as a guillotine saw but can comprise other cutting instruments such as lasers, torches, or the like, or a combination thereof.

Figure 12C:
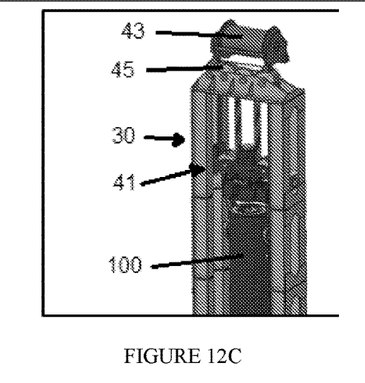

In an embodiment, lifting assembly 40 generally further comprises one or more lifting blocks 41 operatively connected to one or more lifting cart movers 43 (FIG. 12C).

Figure 3A:
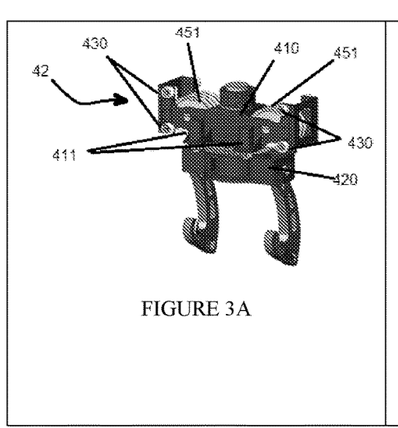
FIGS. 3A and 3B are views in partial perspective of an exemplary rotatable lifting hoist, where 3B is a cutaway view in partial perspective of the exemplary rotatable lifting hoist of 3A.
Figure 3B:
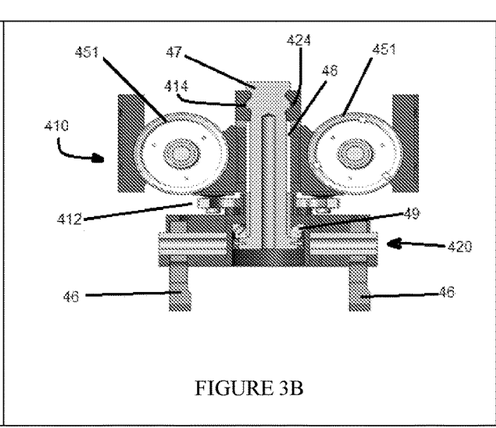

In other embodiments, lifting assembly 40 further comprises one or more selectively rotatable lifting hoists 42 (FIG. 3A). In those embodiments, selectively rotatable lifting hoist 42 further comprises one or more winches 43 (FIG. 1) to which one or more cables 44 (FIG. 12A) are operatively in communication and one or more hoist pulleys 451 (FIG. 3B) disposed intermediate with each such winch 43 and cable 44. Further, in these embodiments, each selectively rotatable lifting hoist 42 further comprises upper portion 410 (FIG. 3B) and lower portion 420 (FIG. 3B). Upper portion 410 typically comprises one or more hoist pulleys 451 (FIG. 3A) operatively in communication with one or more cables 44; motor 411 (FIG. 3A); and one or more gears 412 (FIG. 3B) operatively in communication with motor 411 (FIG. 3A). Lower portion 420 typically comprises lifting hook 46 (FIG. 3B); stem 47 (FIG. 3B) disposed through inner annulus 48 (FIG. 3B) of lower portion 410 and upper portion 420; bearing 49 (FIG. 3B) disposed about an outer surface of stem 47 proximate lower portion 420; one or more load cells 414 (FIG. 3B); and one or more rotational position sensors 424 (FIG. 3B).

Figure 4A:
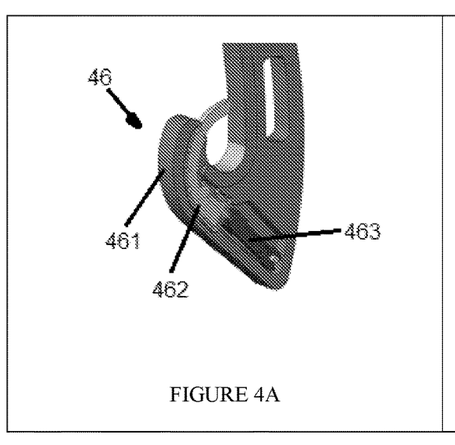
FIGS. 4A and 4B are cutaway views in partial perspective of an exemplary lifting hook.
Figure 4B:
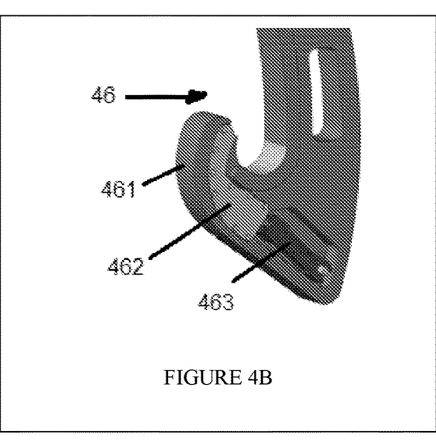

Referring generally to FIGS. 4A and 4B, lifting hook 46 may be selectively actuatable to engaging first securing pin 72 (FIG. 13E) and then prevent first securing pin 72 from becoming disengaged from lifting hook 46. In certain embodiments, one or more lifting hooks 46 comprises a lock comprising curved portion 461 and lock 462, where lock 462, which may be hydraulically or spring actuated using actuator 463, is disposed within all or a portion of curved portion 461.

In certain embodiments, lifting assembly 40 further comprises one or more rollers 430 (FIG. 3A) and sliders 431 (not shown in the figures) operatively in communication with lifting block 41. Rollers 430 may be cooperatively received by sliders 431.

Figure 12D:
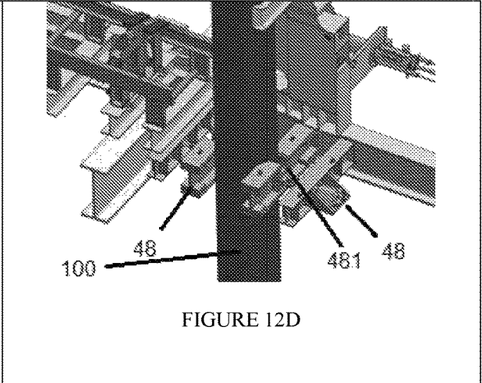
Figure 12E:
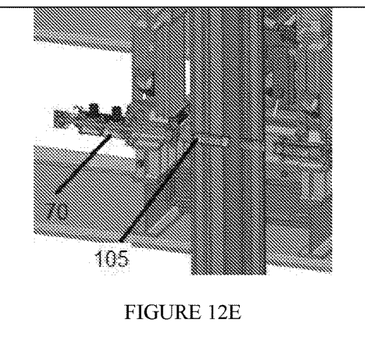
Figure 12F:
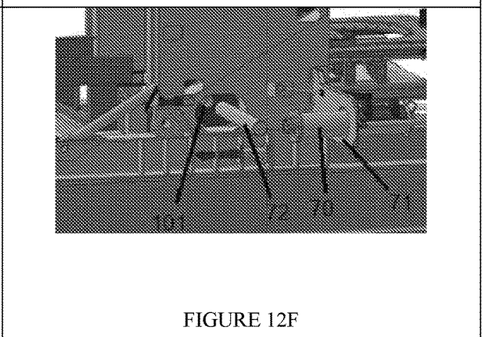
Figure 12H:
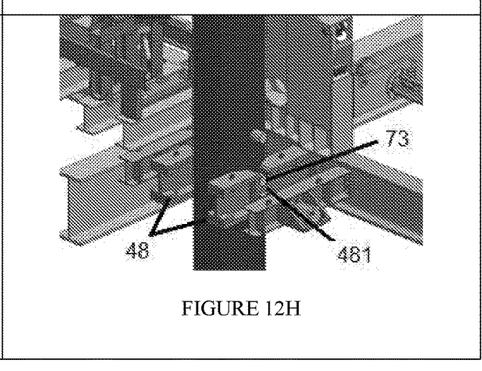

Referring generally to FIG. 12D, clamp 48, comprising one or more pin receivers 481, may be disposed proximate conductor receiving end 11 (FIG. 1) and operative to receive and secure conductor 100.

Figure 5A:
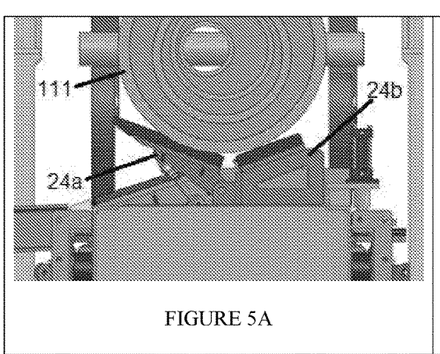
FIGS. 5A and 5B are views in partial perspective of an exemplary support shown with an exemplary upper section.
Figure 5B:
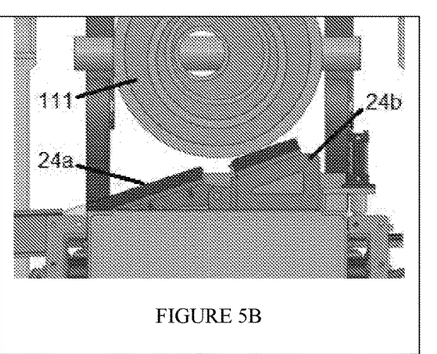

In certain embodiments, referring now to FIGS. 5A and 5B, support 24 is disposed on or proximate a portion of conductor landing cart 21 (FIG. 1), e.g. proximate end 22 of conductor lifting cart 21, and comprises fixed support 24b and movable support 24a. In embodiments, support 24 may be part of law down tray 23 (FIG. 13B).

In the operation of exemplary embodiments, referring to FIG. 6, conductor 100 may be cut, typically severed, into one or several sections subsea by positioning conductor removal system 1 as described above proximate conductor 100 to be cut such that conductor 100 is at least partially within conductor receiving end 11. Once so positioned or prior to such positioning, lifting tower 30 is raised into a substantially vertical position with respect to transport frame 10. This can be accomplished, by way of example and not limitation, by using hydraulic cylinders operatively connected to lifting tower 30 which may also allow for lifting tower 30 to be folded back down to allow for shipping and/or other positioning. Pressure boosters and counterbalance weights and/or valves may be used as well to help control raising and lowering of lifting tower 30.

Once lifting tower 30 is raised, conductor cutter assembly 60 may be maneuvered into a position proximate conductor receiving end 11. In certain embodiments, conductor cutter assembly 60 may have conductor cutter 62 installed on conductor cutter support 61.

Figure 9:
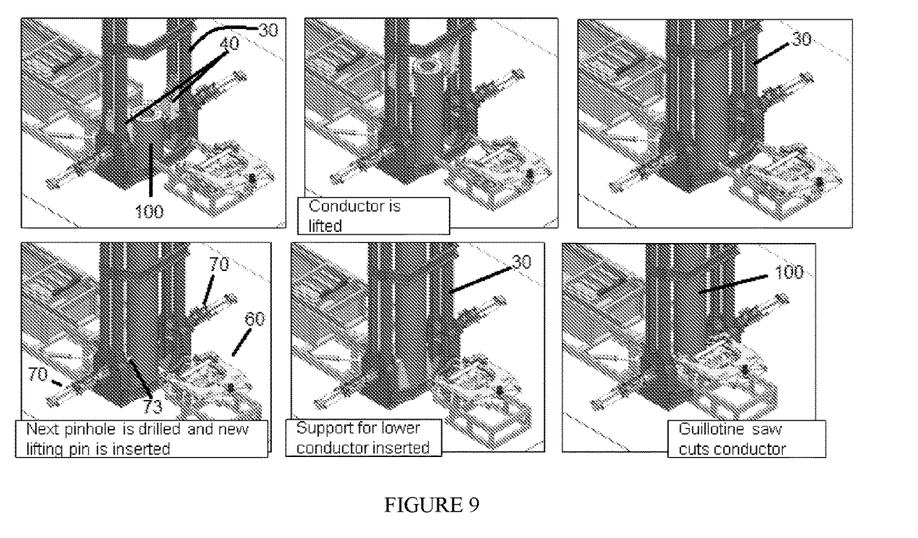
FIG. 9 are views in partial perspective illustrating an lifting and cutting sequence.

In certain embodiments, referring generally to FIG. 7, first hole 101 (FIG. 12F) is drilled into conductor 100 such as by using one or more conductor drills 70 and conductor 100 secured within lifting tower 30 using first securing pin 72, inserted into first hole 101, and lifting assembly 40, e.g. lifting blocks 41, which is typically lowered to secure conductor 100 proximate securing pins 72,73 and then lifted within lifting tower 30. Referring generally to FIG. 9, conductor 100 may be locked into lifting assembly 40 which is then used to lift conductor 100 within lifting tower 30 to a predetermined position.

In certain embodiments, second hole 105 (FIG. 12E) is drilled into conductor 100 such as by using conductor drills 70 and conductor 100 further secured within lifting tower 30 using a second securing pin 73 inserted into second hole 105 and received into pin receiver 481.

Conductor cutter 62 is moved or otherwise position at a location of conductor 100 to be cut, just below upper section 110 (FIG. 12I) and typically proximate conductor 100 intermediate first securing pin 72 and, if used, second securing pin 73 or at a location below securing pints 72.73, and used to cut conductor 100 to create upper conductor segment 111 (FIG. 10) of conductor 100. If two securing pins are used, the cut is typically intermediate first securing pin 72 and second securing pin 73.

Figure 10:
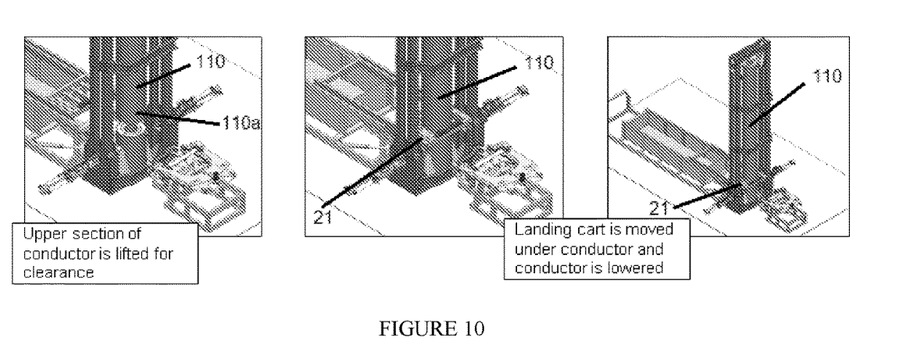
FIG. 10 are views in partial perspective illustrating an after cutting sequence.
Figure 11:
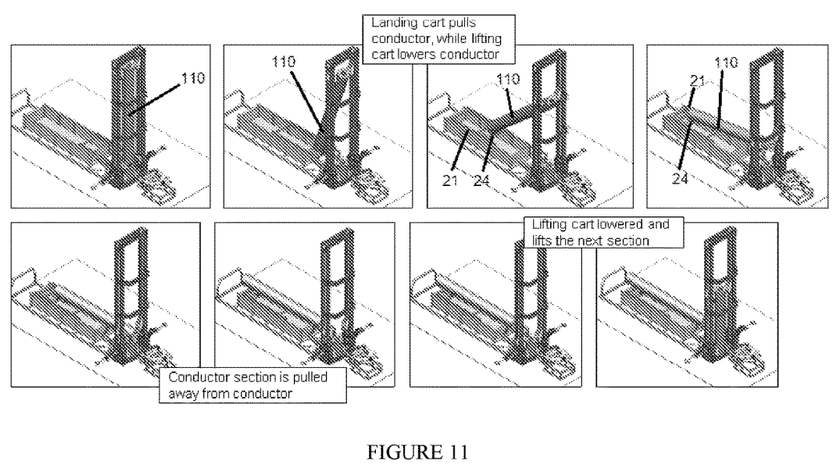
FIG. 11 are views in partial perspective illustrating a removal sequence of a cut conductor.

Referring now to FIG. 10, once conductor 100 has been cut, e.g. severed, lifting assembly 40 is used to lift upper conductor segment 111 (FIG. 10) of conductor 100 and upper conductor segment 111 (FIG. 10) moved onto conductor landing cart 21 into a position to accept lower end 110a of upper conductor segment 111 (FIG. 10) of conductor 100. Once in position, lower end 110a is accepted onto conductor landing cart 21. Upper conductor segment 111 (FIG. 10) of conductor 100 may then be retracted via conductor landing cart 21 and, substantially simultaneously, lifting assembly 40 used to upper conductor segment 111 of conductor 100 unto conductor landing cart 21.

Typically, once conductor 100 has been cut, conductor cutter 62 is retracted or otherwise positioned away from conductor 100.

In certain embodiments, upper conductor segment 111 (FIG. 10) of conductor 100 may be offloaded from conductor landing cart 21 onto storage ramp 70 (FIG. 2).

In a further embodiment, referring generally to FIGS. 2 and 12A, conductor 100 may be cut or otherwise severed by positioning conductor removal system 1 as described above on a deck such as deck 120 and drilling one or more first holes 101 (FIG. 12F) in conductor 100 at or below deck 120, where a set of separate first securing pins 72 is inserted into each such first hole 101.

Referring additionally to FIGS. 12B and 12C, once the set of first securing pins 72 are inserted, conductor 100 and lifting assembly 40 are engaged by securing each such first securing pin 72 into a corresponding lifting hook 46 and lifting assembly 40 used to lift the secured conductor 100 into or proximate lifting tower 30 to a predetermined position. If lifting hooks 46 are used, lock 462 (FIG. 4A) may be allowed to automatically secure pin 72 into lifting hook 46 when first engaging pin 72 by extending lock 462 from curved portion 461 when pin 72 is engaged within lifting hook 46.

Clamp 48 (FIG. 12D) may then be used to secure conductor 100 with respect to lifting tower 30, where clamp 48 further comprises one or more pin receivers 481 (FIG. 12D). Typically, one or more second holes 102 (FIG. 12A) are also drilled into conductor 100 proximate conductor receiving end 11 and a corresponding set of second securing pins 73 (FIG. 12G) inserting into second holes 102. In certain embodiments, lifting assembly 40 rotates conductor 100 until each second securing pin 73 is proximate pin receiver 481 such as by using lifting assembly 40 and lifting assembly 40 used to lower or otherwise position second securing pin 73 into pin receiver 481.

Figure 12I:
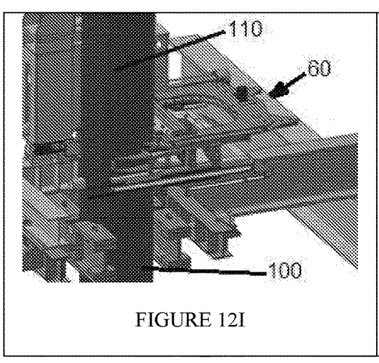

Referring now to FIG. 12I, conductor cutter assembly 60 engages conductor 100 and conductor cutter 62 activated until conductor 100 is severed into upper conductor segment 111, disposed within or proximate lifting tower 30, and lower conductor segment 112. As noted above, conductor cutter assembly 60 is typically slidably mounted onto deck 120.

Figure 12J:
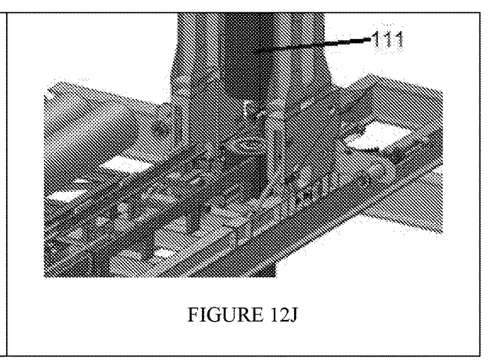

Once conductor 100 has been severed, conductor cutter assembly 60, e.g. conductor cutter 62 at a minimum, is typically retracted from the severed conductor 100 and lifting assembly 40 (FIG. 2) used to raise upper conductor segment 111 (FIG. 12J) within or proximate to lifting tower 30. In embodiments, lifting assembly 40 may further be used to rotate upper conductor segment 111 to a predetermined position such as by using rotatable lifting hoists 42 (FIG. 3A).

Figure 13A:
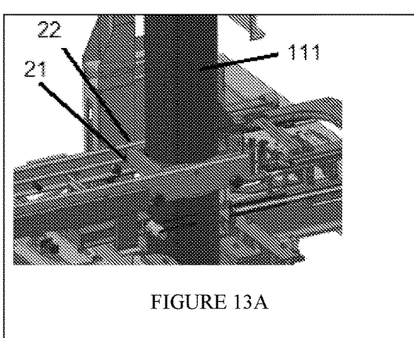
FIGS. 13A-13G are views in partial perspective of the second exemplary embodiment completing the process.
Figure 13B:
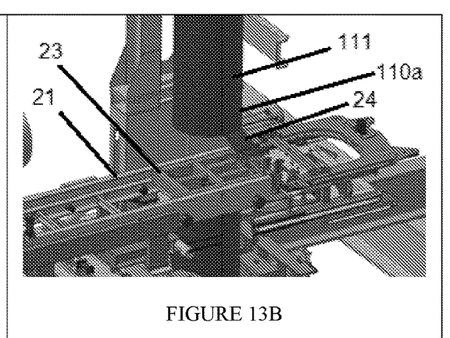
Figure 13C:
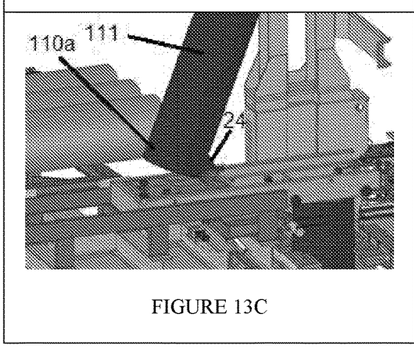
Figure 13D:
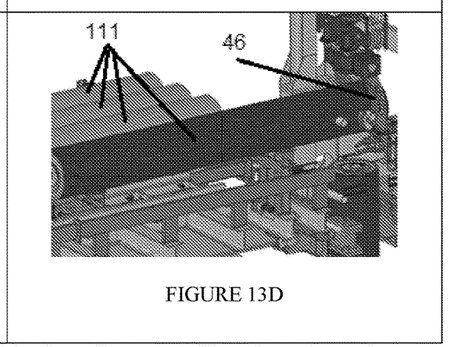

Referring to FIG. 13A, in preferred embodiments, end 22 of conductor lifting cart 21 may be positioned under upper conductor segment 111 once upper conductor segment 111 has been severed from conductor 100 and lay down tray 23 (FIG. 13B) locked or otherwise secured within conductor lifting cart 21. Referring additionally to FIG. 13C, on locked or otherwise secured, lay down tray 23 may accept severed upper conductor segment 111 such as by lowering the severed upper conductor segment 111 onto lay down tray 23. In certain embodiments, support 24 (FIG. 13C) may be raised a under a portion of severed upper conductor segment 111, e.g. at position 24 (FIG. 13C). Conductor lifting cart 21 may then be retracted away from lifting tower 30, e.g. sliding conductor lifting cart 21 along lifting cart assembly 20.

Figures 13E, 13F, 13G:
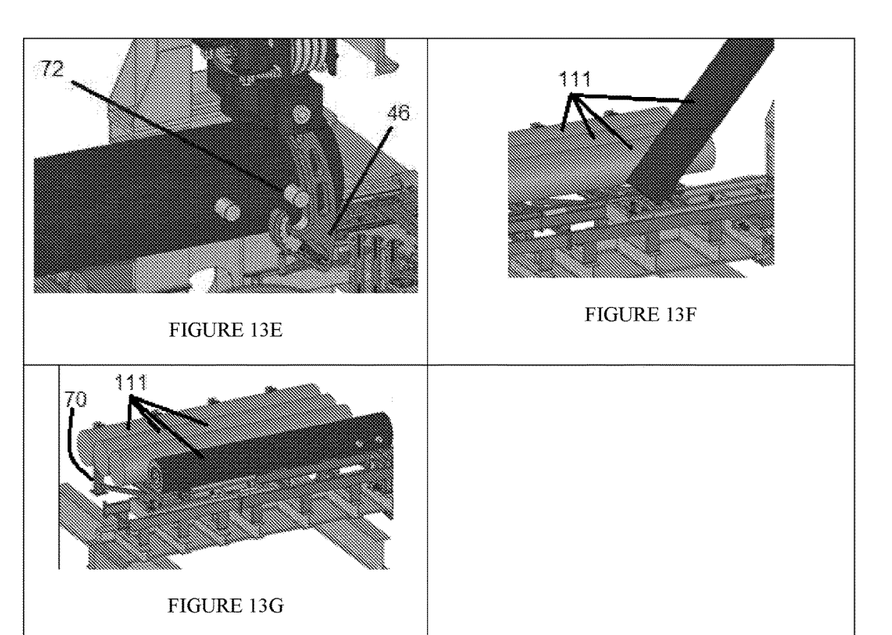

If lifting hook 46 is used, referring generally to FIG. 13E, lock 462 (FIG. 4A) may be allowed to automatically retreat into curved portion 461 (FIG. 4A) when lifting hook 46 is disengaged from pin 72. By way of example and not limitation, if lifting hooks 46 are used, lifting assembly 40 may be lowered to disengage lifting hooks 46. In certain embodiments, pins 72,73 may then be replaced such as with anti-stripping pins. Once lifting hooks 46 are disengaged, support 24 (FIG. 13C) may be lowered to allow severed upper conductor segment 111 be positioned into or onto staging area 70 (FIG. 2) such by allowing upper conductor segment 111 to roll onto or into staging area 70. Typically, movable support 24b (FIG. 5A) is initially raised to help secure upper conductor segment 111 and lowered (FIG. 5A) to allow upper conductor segment 111 to exit conductor landing cart 21.

These steps may be repeated for each further section of conductor 100 to be cut, if any.

The foregoing disclosure and description of the inventions are illustrative and explanatory. Various changes in the size, shape, and materials, as well as in the details of the illustrative construction and/or an illustrative method may be made without departing from the spirit of the invention.

The invention claimed is:

1. A conductor removal system, comprising: a. a transport frame, comprising a conductor receiving end; b. a conductor landing cart assembly connected to the transport frame, comprising: i. a conductor landing cart operatively and movingly disposed with respect to the transport frame, the conductor landing cart configured to receive a portion of a conductor; and ii. a conductor landing cart assembly mover operatively in communication with the conductor landing cart; c. a lifting tower pivotally connected to the transport frame proximate the conductor receiving end; d. a lifting assembly disposed proximate the lifting tower; and e. a conductor cutter assembly comprising: i. a conductor cutter support; and ii. a conductor cutter selectively movably connected to the conductor cutter support; f. wherein the conductor cutter assembly is movably disposed proximate a portion of the conductor landing cart, and the portion of the conductor landing cart is interior to the conductor landing cart.

2. The conductor removal system of claim 1, further comprising:
a. a conductor drill positioned about a predetermined portion of the lifting tower proximate the conductor receiving end and operatively connected to a selectively movable drill door; and
b. a first securing pin adapted to be pivotally received into a first hole located at a first predetermined location proximate a first predetermined portion of the conductor.

3. The conductor removal system of claim 1, further comprising a second securing pin adapted to be pivotally received into a second hole located at a second predetermined location proximate a second predetermined portion of the conductor distally located along the conductor from the first predetermined location.

4. The conductor removal system of claim 1, wherein the conductor cutter comprises a wire saw.

5. The conductor removal system of claim 1, wherein the lifting assembly further comprises:
a. a lifting block adapted to releasably secure the portion of the conductor, the lifting block slidingly mounted about a predetermined portion of the lifting tower; and
b. a lifting cart mover operatively in communication with the lifting block.

6. The conductor removal system of claim 5, wherein the lifting assembly further comprises a roller and a slider operatively in communication with the lifting block.

7. The conductor removal system of claim 1, wherein the lifting assembly further comprises a selectively rotatable lifting hoist.

8. The conductor removal system of claim 7, wherein the selectively rotatable lifting hoist further comprises:
a. a winch;
b. a cable operatively in communication with the winch; and
c. a hoist pulley disposed intermediate the winch and the cable.

9. The conductor removal system of claim 7, wherein the selectively rotatable lifting hoist further comprises:
a. an upper portion, comprising:
i. a pulley operatively in communication with the cable;
ii. a motor; and
iii. a gear operatively in communication with the motor; and
b. a lower portion, comprising a lifting hook;
c. a stem disposed through an inner annulus of the lower portion and the upper portion;
d. a bearing disposed about an outer surface of the stem proximate the lower portion;
e. a load cell; and
f. a rotational position sensor.

10. The conductor removal system of claim 9, wherein the lifting hook comprises a selectively actuatable lock adapted to prevent a first securing pin from becoming disengaged from the lifting hook.

11. The conductor removal system of claim 1, further comprising a clamp disposed proximate the conductor receiving end and operative to receive the conductor.

12. The conductor removal system of claim 1, wherein the conductor lifting cart further comprises a lay down tray selectively movable to a position proximate the conductor receiving end.

13. A method of cutting a conductor subsea using a conductor removal system comprising a transport frame which comprises a conductor receiving end; a conductor landing cart assembly which comprises a conductor landing cart, operatively and movingly connected to the transport frame and configured to receive a portion of a conductor, and a conductor landing cart assembly mover operatively in communication with the conductor landing cart; a lifting tower pivotally connected to the transport frame proximate the conductor receiving end; a lifting assembly comprising a lifting block, slidingly mounted about a predetermined portion of the lifting tower and) adapted to releasably secure the portion of the conductor, and a lifting cart mover operatively in communication with the lifting block; and a conductor cutter assembly comprising a conductor cutter support and a conductor cutter selectively movably connected to the conductor cutter support, the method comprising:
   a. positioning the conductor removal system proximate a conductor to be cut such that the conductor is disposed proximate the conductor receiving end;
   b. raising the lifting tower into a substantially vertical position with respect to the transport frame;
   c. maneuvering the conductor cutter into a position proximate the conductor at a location proximate the conductor receiving end;
   d. drilling a first securing hole into the conductor;
   e. securing the conductor within the lifting tower using a first securing pin inserted into the first securing hole and by lowering the lifting assembly to further secure the conductor within the lifting frame proximate the securing pin;
   f. locking the conductor into the lifting assembly;
   g. using the lifting assembly to lift the conductor within the lifting tower to a predetermined position;
   h. moving the conductor cutter assembly proximate the conductor intermediate the first securing pin and the second securing pin;
   i. using the conductor cutter to cut the conductor intermediate the first securing pin and the second securing pin to create an upper conductor section of the conductor;
   j. using the lifting assembly to lift the upper conductor section of the conductor once the conductor has been cut;
   k. moving the conductor landing cart into a position to accept a lower end of the upper conductor section of the conductor;
   l. accepting the lower end of the upper conductor section onto the conductor landing cart; and
   m. using the lifting assembly to lower the upper conductor section of the conductor unto the conductor landing cart.

14. The method of claim 13, further comprising:
   a. drilling a second securing hole into the conductor; and
   b. further securing the conductor within the lifting tower using a second securing pin inserted into the second securing hole.

15. The method of claim 13, further comprising:
   a. substantially simultaneously with using the lifting assembly to lower the upper conductor section of the conductor unto the conductor landing cart, retracting the conductor cutter once the conductor has been cut; and
   b. retracting the conductor landing cart.

16. The method of claim 13, further comprising offloading the upper conductor section of the conductor from the conductor landing cart onto storage ramp.

17. A method of cutting a conductor subsea using a conductor removal system, comprising a transport frame which comprises a conductor receiving end; a conductor landing cart assembly which comprises a conductor landing cart, operatively and movingly connected to the transport frame and configured to receive a portion of a conductor, and a conductor landing cart assembly mover operatively in communication with the conductor landing cart; a lifting tower pivotally connected to the transport frame proximate the conductor receiving end; a lifting assembly comprising a winch to which a cable is operatively in communication, a pulley disposed intermediate with the winch and the cable, and a selectively rotatable lifting hoist operatively connected to the cable and comprising an upper portion comprising a hoist pulley operatively in communication with the cable, a motor, and a gear operatively in communication with the motor; and a lower portion comprising a lifting hook, a stem disposed through an inner annulus of the lower portion and the upper portion, a bearing disposed about an outer surface of the stem proximate the lower portion, a load cell, and a rotational position sensor; and a conductor cutter assembly comprising a conductor cutter support and a conductor cutter selectively movably connected to the conductor cutter support, the method comprising:
   a. positioning and securing the conductor removal system on a deck;
   b. drilling a first hole in a conductor below the deck;
   c. inserting a first securing pin into the first hole;
   d. engaging the conductor and the selectively rotatable lifting hoist by securing the first securing pin into the lifting hook;
   e. using the lifting assembly to lift the secured conductor into the lifting tower to a predetermined position;
   f. using a clamp to secure the conductor within the lifting tower, the clamp further comprising a pin receiver;
   g. drilling a second hole in the conductor proximate the conductor receiving end;
   h. inserting a second securing pin into the second hole;
   i. using the selectively rotatable lifting hoist to rotate the conductor until the second securing pin is proximate the pin receiver and the second securing pin is proximate the pin receiver;
   j. using the lifting assembly to lower the second securing pin into the pin receiver;
   k. engaging the conductor with the conductor cutter assembly;
   l. using the conductor cutter to cut the conductor until the conductor is severed into an upper conductor segment disposed within the lifting tower and a lower conductor segment;
   m. retracting the conductor cutter assembly from the severed upper conductor segment;
   n. using the lifting assembly to raise the upper conductor segment within the lifting tower;
   o. using the lifting assembly to rotate the upper conductor segment to a predetermined position;
   p. positioning an end of the conductor lifting cart under the upper conductor segment;
   q. locking the lay down tray within the conductor lifting cart;
   r. lowering the severed upper conductor segment onto the lay down tray;
   s. raising a support under a portion of the upper conductor segment;
   t. retreating the conductor lifting cart away from the lifting tower;
   u. lowering the lifting assembly to disengage the lifting hook;
   v. replacing the pins with anti-stripping pins; and
   w. lowering a predetermined portion of the support to allow the upper conductor segment to roll into a staging area.

18. The method of claim 17, wherein the lifting hook comprises a curved portion and a selectively actuatable lock disposed within the curved portion, the method further comprising:

a. allowing the lock to automatically secure the pin by extending the lock from the curved portion when the pin is engaged within the hook; and
b. allowing the lock to automatically retreat into the curved portion when the hook is disengaged from the pin.

\* \* \* \* \*